United States Patent [19]

Foley

[11] Patent Number: 5,407,397

[45] Date of Patent: * Apr. 18, 1995

[54] BELT TENSIONER, COMPONENTS THEREFOR AND METHODS OF MAKING THE SAME

[75] Inventor: Mark P. Foley, Springfield, Mo.

[73] Assignee: Dayco Products, Inc., Dayton, Ohio

[ * ] Notice: The portion of the term of this patent subsequent to Sep. 20, 2011 has been disclaimed.

[21] Appl. No.: 263,659

[22] Filed: Jun. 21, 1994

Related U.S. Application Data

[62] Division of Ser. No. 124,749, Sep. 21, 1993, Pat. No. 5,348,514.

[51] Int. Cl.⁶ ............................................. F16H 7/08
[52] U.S. Cl. ..................................................... 474/135
[58] Field of Search ........................ 474/101, 109–111, 474/113–117, 133–138

[56] References Cited

U.S. PATENT DOCUMENTS

| | | | |
|---|---|---|---|
| 4,938,734 | 7/1990 | Green et al. | 474/135 |
| 4,952,197 | 8/1990 | Henderson | 474/135 |
| 5,334,110 | 8/1994 | Gardner et al. | 474/135 |
| 5,342,249 | 8/1994 | Gardner et al. | 474/135 |

*Primary Examiner*—Michael Powell Buiz
*Attorney, Agent, or Firm*—Joseph V. Tassone; Richard L. Marsh

[57] ABSTRACT

A tensioner for a power transmission belt is provided that is adapted to be operated in an endless path, the tensioner comprising a support for being fixed relative to the belt, a belt engaging member carried by the support and being movable relative thereto. The tensioner has a mechanical spring operatively associated with the support and the belt engaging member for urging the belt engaging member relative to the support and against the belt with a force to tension the belt. The tensioner has a frictional dampening device operatively associated with the support and the belt engaging member to dampen the movement of the belt engaging member relative to the support in at least one direction of movement thereof, the dampening device having a longitudinal axis, the support comprising a shaft having a longitudinal axis and being fixed from movement relative to the belt engaging member. The belt engaging member has a portion thereof being rotatably carried by the shaft so as to rotate relative to the shaft, the dampening device has a pair of frictionally engaging first and second surfaces. The mechanical spring provides the force for urging the belt engaging member relative to the support and against the belt to tension the belt and further provides a certain force for urging the first surface against the second surface to dampen the movement of the belt engaging member.

20 Claims, 3 Drawing Sheets

BELT TENSIONER, COMPONENTS THEREFOR AND METHODS OF MAKING THE SAME

CROSS REFERENCE TO RELATED APPLICATIONS

This application is a divisional patent application of its parent patent application, Ser. No. 124,749, filed Sep. 21, 1993, now U.S. Pat. No. 5,348,514.

BACKGROUND OF THE INVENTION

1. Field of the Invention

This invention relates to a new belt tensioner as well as to new methods of making such a new belt tensioner and to methods of assembling such a new belt tensioner.

2. Prior Art Statement

It is known to provide a belt tensioner construction having spring means for biasing a lever means in a belt tensioning direction including two pairs of volute springs, for instance see U.S. Pat. No. 4,309,174 to Sproul. Sproul further teaches frictional sliding contact between successive coils.

It is also known to provide a belt tensioner construction having spring means for biasing a lever means in a belt tensioning direction and damping means wherein the biasing force and the dampening force both decrease as the lever means moves in a belt tensioning direction, for instance see U.S. Pat. No. 4,473,362 to Thomey, et.al.

It is also known to provide a belt tensioner construction having spring means for biasing a lever means in a belt tensioning direction and frictional dampening means comprised of a pair of frictionally engaging parts and additional spring means for biasing one of said parts against the other of said parts. For instance, see U.S. Pat. Nos. 4,596,538 and 4,832,666 to Henderson, or U.S. Pat. Nos. 4,938,734, 5,030,172 and 5,035,679 to Green, et al.

It is also known to provide a belt tensioner construction having spring means for biasing a lever means in a belt tensioning direction and a damping washer engaging a cooperating surface and having an axial force component which supplies proportional damping. For instance, see U.S. Pat. No. 4,698,049 to Bytzek, et al.

It is also known to provide a belt tensioner construction having spring means for biasing a lever means in a belt tensioning direction and frictional dampening means comprised of a stack of interengaging pairs of frictionally engaging surfaces and having an axial force component which supplies proportional damping. For instance, see U.S. Pat. No. 4,689,037 to Bytzek.

It is also known to provide a belt tensioner construction having spring means for biasing a lever means in a belt tensioning direction and frictional dampening means comprised of a stack of interengaging pairs of frictionally engaging surfaces and having an axial force component which may be supplied by an additional spring means for biasing said surfaces against each other. For instance, see U.S. Pat. No. 4,689,037 to Bytzek.

SUMMARY OF THE INVENTION

It is an object of this invention to provide a belt tensioner construction having spring means for biasing a lever means in a belt tensioning direction comprising a single volute spring and by displacing the volute axially utilizing the resulting spring force in the axial direction to provide a desired dampening effect.

It is another object of this invention to provide a belt tensioner construction having spring means for biasing a lever means in a belt tensioning direction and frictional dampening means comprised of a pair of frictionally engaging parts whereby said spring means further provides an axial force for biasing one of said parts against the other of said parts.

It is another object of this invention to provide a belt tensioner construction having spring means for biasing a lever means in a belt tensioning direction and damping means wherein said damping force does not decrease as the lever means moves in a belt tensioning direction.

Another object of this invention, to provide a belt tensioner construction having spring means providing a damping force which remains essentially constant throughout the life of the tensioner.

It is yet another object of this invention to provide a belt tensioner construction having spring means for biasing a lever means in a belt tensioning direction and a damping washer engaging a cooperating surface whereby said spring means provides an axial force component for biasing said damping washer against said cooperating surface.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
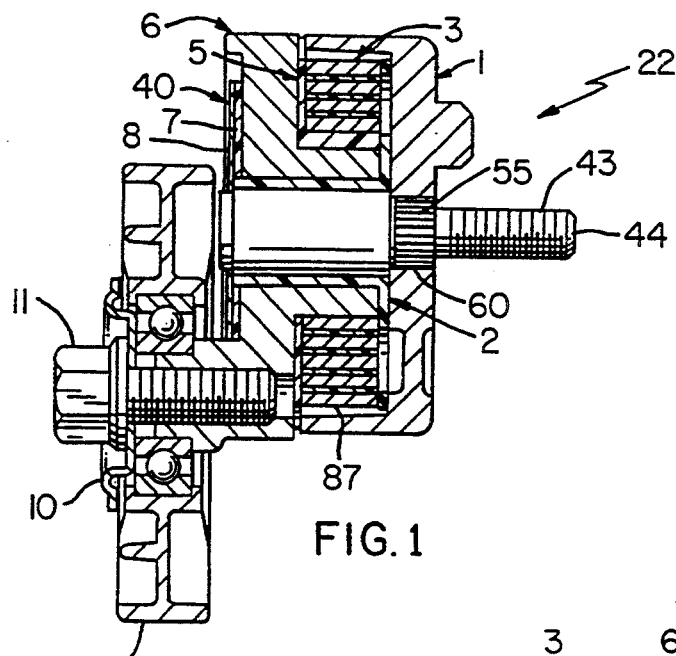
FIG. 1 is a section view of the tensioner of this invention as shown in FIG. 2.

While the various features of this invention are hereinafter illustrated and described as providing a belt tensioner for a particular power transmission belt of a particular motor vehicle engine, it is to be understood that the various features of this invention can be utilized singly or in any combination thereof to provide a belt tensioner for other arrangements as desired.

Therefore, this invention is not to be limited to only the embodiments illustrated in the drawings, because the drawings are merely utilized to illustrate one of the wide variety of uses of this invention.

Many automobile engines currently on the market utilize an endless power transmission belt for driving a plurality of driven accessories and employ a tensioning system utilized to provide a tensioning force on the endless power transmission belt which may be of any suitable type known in the art and is preferably made primarily of a polymeric material because the unique features of the tensioner of this invention readily permit the tensioner to tension a belt having a polyester load-carrying cord in an efficient manner.

In many of these automotive accessory drives it is necessary to provide the correct tension to control the tension ratio throughout the life of the belt. With the advent of the single belt V-ribbed drive system, this is of increasing importance since belts are longer and some accessories are driven off the back side of the belt as a flat belt drive.

Automatic tensioners of various descriptions have been developed having the requisite characteristics enabling them to tune the belt system to remove input torsionals and prevent or reduce harmonics while allowing the tensioner to respond to changes in the belt tension requirements. For instance, see the aforementioned U.S. Pat. Nos. 4,596,538 and 4,832,666 to Henderson or 4,938,734, 5,030,172 and 5,035,679 to Green, et al., all now incorporated into this application by this reference thereto. All of the above tensioners, however, utilize a separate spring means to provide the dampening force. Thus, it is known that it is difficult to maintain such a belt under proper tension to insure non-slipping engagement and driving of the driven sheaves without the complicated tensioners of the prior art.

It is believed that the improved belt tensioner 22 of this invention functions in a manner to provide the necessary tensioning force on the belt and to overcome the more costly and complicated dampening mechanisms of the tensioners of the prior art by additionally providing a dampening force utilizing the axial displacement of the tensioning spring.

In particular, it was found in the tensioners set forth in the aforementioned patents to Henderson, U.S. Pat. Nos. 4,596,538 and 4,832,666, or Green, et al., U.S. Pat. Nos. 4,938,734, 5,030,172 and 5,035,679 that replacement of the planar flat wire spring means with the axial displacement of the volute spring of the instant invention provides the necessary force for tensioning the belt and dampening of torsional vibrations, including but not limited to, those vibrations caused by the cycling on and off of the compressor of an air conditioning system for an automobile as described in the aforementioned U.S. Pat. No. 4,596,538 to Henderson, and has additionally resulted in elimination of the separate spring means used to bias the annular pad of friction material against a second frictional surface.

Figure 2:
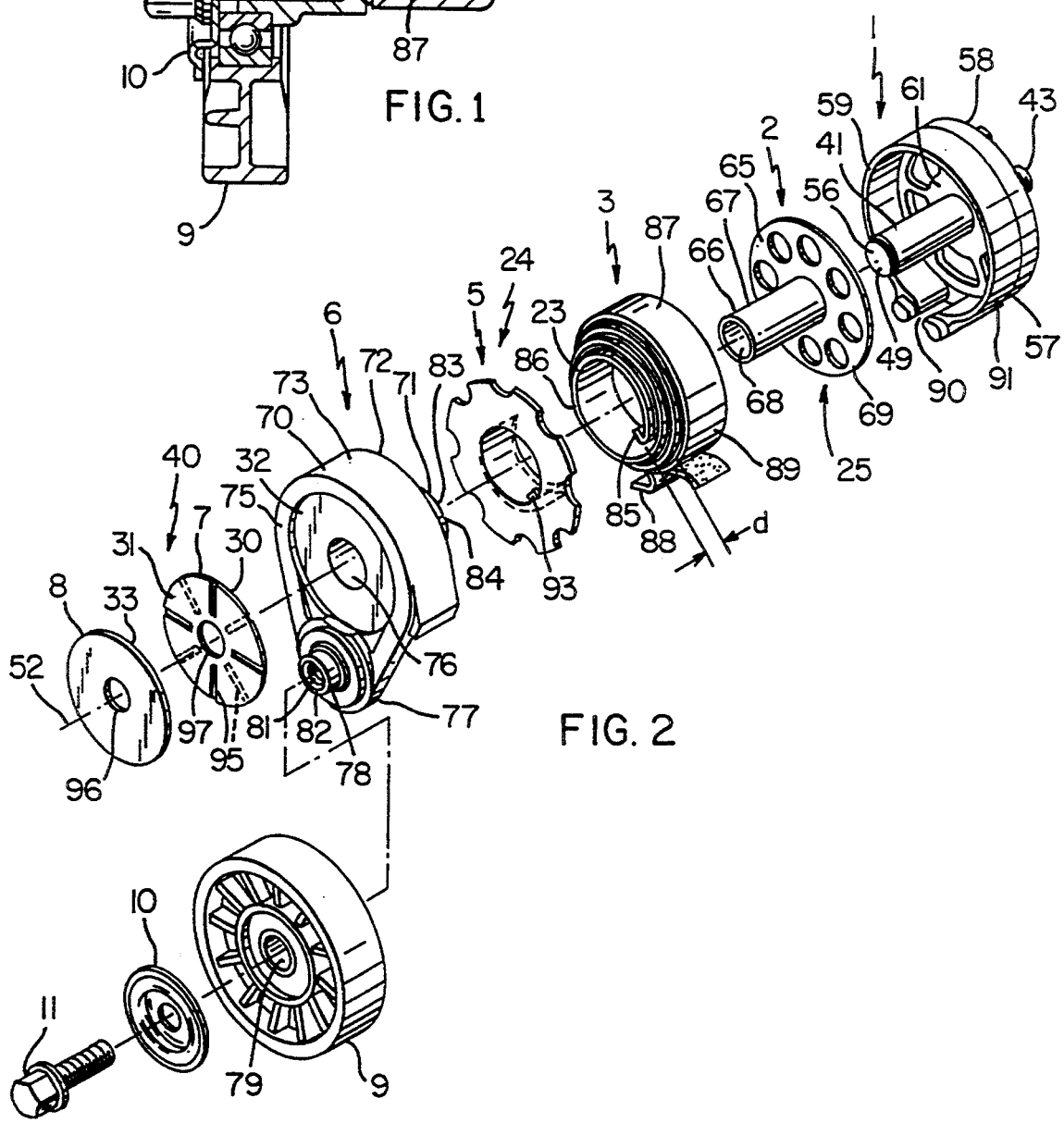
FIG. 2 is an exploded perspective view illustrating the various parts of the belt tensioner of one embodiment of this invention.

As best illustrated in FIGS. 1 and 2, the improved belt tensioner 22 of this invention comprises a support means 1 adapted to be fixed to a mounting bracket (not shown) of the engine (not shown). A belt engaging means generally indicated by the reference numeral 6 is movably carried by the support means 1 in a manner hereinafter set forth.

The tensioner 22 has a mechanical spring means that is generally indicated by the reference numeral 3 operatively associated with the support means 1 and the belt engaging means 6 to tend to urge the belt engaging means 6 relative to the support means 1 against the belt with a force to tension the belt in a manner well known in the art. The belt tensioner 22 also includes a frictional dampening means generally indicated by the reference numeral 40 which is operatively associated with the support means 1 and the belt engaging means 6 to dampen movement of the belt engaging means 6 relative to the support means 1 in at least one direction of movement in a manner hereinafter set forth.

The support means 1 includes a tubular member or shaft means 41 that includes a fastening means 43 that is adapted to fasten the tensioner 22 to a bracket. In this manner, the friction dampening means 40, the spring means 3, the shaft means 41, the support means 1 and the belt engaging means 6 have a common longitudinal axis 52 and are coaxially aligned therewith.

Support means 1 further comprises a cup-shaped member 57 having a closed end 58 and an open end 59, the closed end 58 having an opening 60 passing therethrough and being adapted to receive the knurled portion 55 of the end 44 of the shaft means 41 therethrough so that the knurled portion 55 can be subsequently press fitted into the opening 60 of the cup shaped member 57, so that the cup shaped member 57 is fixed to the shaft means 41 and defines part of the support means 1 of the tensioner 22 of this invention. Of course, the end 44 of the shaft means 41 could be secured to the closed end 58 of the cup shaped member 57 in any other suitable manner such as by brazing, turning over or staking the cup shaped member 57 to the knurled portion 55 of the shaft means 41. It must also be appreciated that the shaft means 41 could comprise tubular portion having a cylindrical opening passing completely therethrough to receive a fastening means whereby the tubular portion of shaft means 41 is radially expanded into the opening 60 in the closed end 58 of the cup shaped member 57.

Bushing member 2 comprising a cylindrical bearing sleeve 66 having a tubular portion 67 and a disc end member 69 with a cylindrical opening 68 passing therethrough is telescopically disposed on the shaft means 41 of the cup shaped member 57. Disc end member 69 is adapted to be disposed against the inside surface 61 of closed end 58 of cup shaped member 57. Bushing member 2 may be formed of any suitable material, such as an anti-friction plastic material, to tend to reduce friction between mechanical spring means 3 and inside surface 61 as fully set forth in U.S. Pat. No. 4,596,538, whereby this patent is also being incorporated into this disclosure by this reference thereto.

The belt engaging means 6 comprises a metallic pivot arm 70 having a coaxially disposed tubular portion 71 extending from one side 72 of an end portion 73 thereof. Tubular portion 71 and end portion 73 have a cylindrical bore 76 passing completely therethrough so as to be adapted to be telescopically disposed on the fixed shaft means 41 with bearing sleeve 66 disposed therebetween so that the end portion 73 of pivot arm 70 can rotate or oscillate relative to the fixed shaft means 41.

The other end 77 of pivot arm 70 has a pivot extension 78 adapted to pass through a central opening 79 in a belt pulley 9 which is fastened thereon by a suitable fastening means 11 received in a threaded internal bore 81 in the end 82 of pivot extension 78 whereby belt pulley 9 is adapted to rotate on pivot extension 78 and engage against the belt in a manner well known in the art.

Tubular portion 71 of pivot arm 70 has a transverse axial slot 84 formed in the outer surface 83 thereof and is adapted to receive an inwardly bent end 85 of an inner coil 86 of a spirally wound metallic spring member 87 of tensioner 22.

Pivot arm 70 has a flat circular surface 32 disposed on side 75 opposite the one side 72 and is coaxially aligned with and perpendicular to bore 76 in tubular portion 71. Surface 32 is adapted to receive friction dampening means 40 as hereinafter described.

Spring member 87 has an outer end 88 bent at an angle relative to an outer coil 89 and is adapted to be received in a slot 90 formed in an annular side wall 91 of the cup shaped member 57 so as to fasten the outer end 88 of the spring member 87 to the support means 1. The inwardly bent end 85 of the spring member 87 is interconnected to belt engaging means 6 in slot 84 to tend to urge the belt pulley 9 toward the belt with the tensioning force of the spring member 87 in the manner set forth in the aforementioned patents.

Dampening means 40 of tensioner 22 comprises an annular friction dampening plate 7 of suitable friction material and an arm stop 8 cooperating with friction dampening plate 7 to provide the dampening function of dampening means 40. Friction dampening plate 7 has a hole 97 disposed in the center thereof which is adapted to fit over the end 49 of the shaft means 41 and be rotatably movable upon shaft means 41. Arm stop 8 has a hole 96 disposed in the center thereof which is adapted to fit on the reduced end portion 56 of the end 49 of shaft means 41 and be rigidly affixed thereto by means such as rolling over, staking, brazing or radial riveting.

First and second surfaces 30 and 31, on opposite sides of friction dampening plate 7 are adapted to engage surface 32 on side 75 of pivot arm 70 and surface 33 on arm stop 8 respectively. Surface 32 on arm 70 is adapted to move relative to surface 30 on dampening plate 7 as arm 70 rotates relative to mounting member 1. Similarly, surface 31 on dampening plate 7 is adapted to move relative to surface 33 on arm stop 8 as arm stop 8 is fixed to mounting member 1. First and second surfaces 30 and 31 may have radial slots 95 disposed therein to receive a lubricant in order to control the friction between surfaces 30 and 32 or 31 and 33, respectively.

Spring means 3 is disposed between bushing member 2 and spring bushing member 5, wherein spring bushing member 5 is rotationally oriented to belt engaging means 6 by tang 93 being received in slot 84 of the tubular portion 71 as fully described in the aforementioned U.S. Pat. No. 4,596,538 to Henderson, the details of which need not be herein described.

Figure 3:
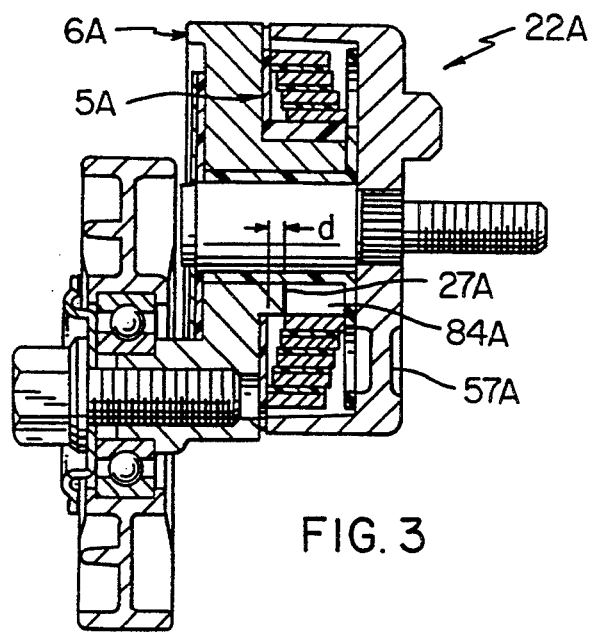
FIG. 3 is a section view of another tensioner of this invention as shown in FIG. 4.
Figure 5:
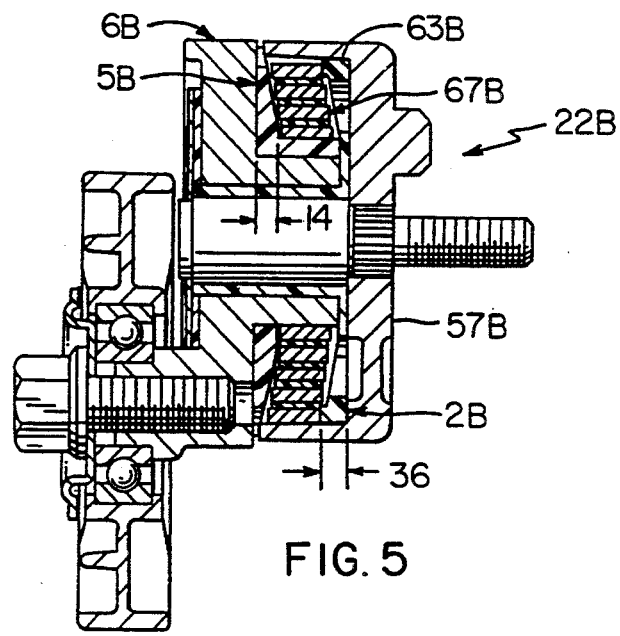
FIG. 5 is a section view of another tensioner of this invention as shown in FIG. 6.

The desired dampening force is provided by spirally wound spring 87 which is wound circumferentially and further displaced axially in a cone like shape by a distance "d", as shown in FIG. 2, FIG. 3 and FIG. 5, creating a normal force corresponding to the desired dampening force as will be hereinafter described. Upon assembly of the tensioner 22 of this invention, a portion of one edge 23 of inner coil 86 of spirally wound spring 87 bears against first offsetting means 24 such as spring bushing member 5 and/or the end of slot 84 and a portion of one edge (not shown) of outer coil 89 of spirally wound spring 87 bears against second offsetting means 25 such as against the inside surface 65 of disc end member 69 of bushing member 2 and/or the end of slot 90. In the assembly of the tensioner 22 of FIG. 2, arm plate 8 is forced axially toward support means 1 and disposed over reduced end 56 of shaft 41 and rigidly fixed thereto. In so doing, mechanical spring means 3 is returned to a substantially flat coil like shape forcing spring bushing member 5 against the one side 72 of metallic pivot arm 70 which in turn forces pivot arm 70 against dampening means 40 providing the required normal force for the desired dampening force. The actual dampening force is established by the relative movement between surfaces 30 and 32 and/or surfaces 31 and 33, respectively.

It was found according to the teachings of this invention that during operation of the belt tensioner 22, that the spirally wound spring 87 when displaced a distance "d" of approximately 0.67 inches from the free wound position thereof, between first offsetting means 24 and second offsetting means 25 provides an axial normal force of approximately 50 pounds. Table 1 shows the actual axial normal force of six of the spirally wound metallic springs 87 displaced axially a distance "d" of 0.67 inches in the free state thereof when spring 87 was returned to the substantially flat shape shown in FIG. 1. Table 1 further shows that the total dampening force on two examples of tensioner 22 utilizing springs 87 of the present invention at various times during the operating life on an accelerated test. It is readily observed from Table 1 that the frictional dampening torque remained substantially constant throughout the life of the tensioner 22.

TABLE 1

| TENSIONER NUMBER | SPRING AXIAL FORCE LBS | INCH-POUNDS TORQUE at % LIFE | | | | | | |
|---|---|---|---|---|---|---|---|---|
| | | 0 | 3 | 17 | 31 | 43 | 70 | 99 |
| 1 | 47.2 | 27 | 32 | 37 | 29 | 32 | 33 | 33 |
| 2 | 48.6 | | | | | | | |
| 3 | 50.4 | | | | | | | |
| 4 | 54.5 | | | | | | | |
| 5 | 46.6 | | | | | | | |
| 6 | 47.7 | 30 | 42 | 35 | 30 | 33 | 31 | 38 |

While the tensioner 22 of this invention has been previously described as having a spirally wound spring 87 being displaced axially by a distance "d", it can be readily observed by one skilled in the art, that a substantially flat coil spring as utilized in the aforementioned U.S. Pat. No. 4,596,538 to Henderson could be displaced a distance "d" by other means to provide the required axial normal force.

Figure 4:
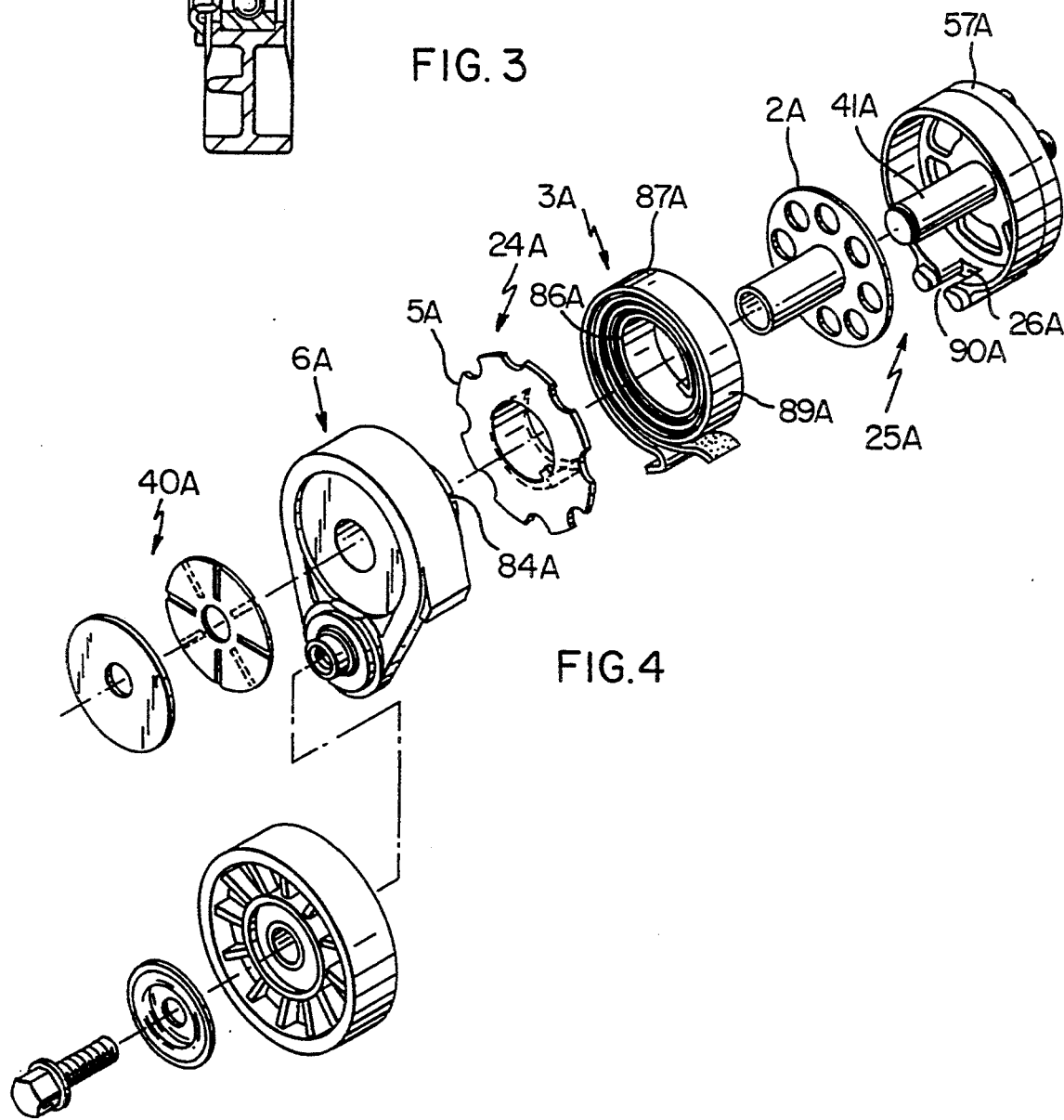
FIG. 4 is an exploded perspective view illustrating the various parts of the belt tensioner as shown in FIG. 3.

For example, another tensioner of this invention may be provided which is generally indicated by the reference numeral 22A in FIGS. 3 and 4 and parts thereof similar to the tensioner 22 previously described are indicated by like reference numerals followed by the reference letter "A". Referring now to FIG. 3 and FIG. 4, first offsetting means 24A is created by relocating the end 27A of slot 84A by shortening the slot 84A of belt engaging means 6A by a distance distance "d". Similarly, second offsetting means 25A is created by relocating the end 26A of slot 90A by reducing the length of slot 90A by a distance "d". When friction dampening means 40A, belt engaging means 6A, spring bushing member 5A, flat spirally wound metallic spring 87A and bushing member 2A are disposed upon shaft 41A of cup shaped member 57A, with a portion of the inside coil 86A in contact with first offsetting means 24A, and a portion of the outer coil 89A abutting second offsetting means 25A, then spring means 3A is displaced a distance "d" from its free state thereof providing the required normal force.

Figure 6:
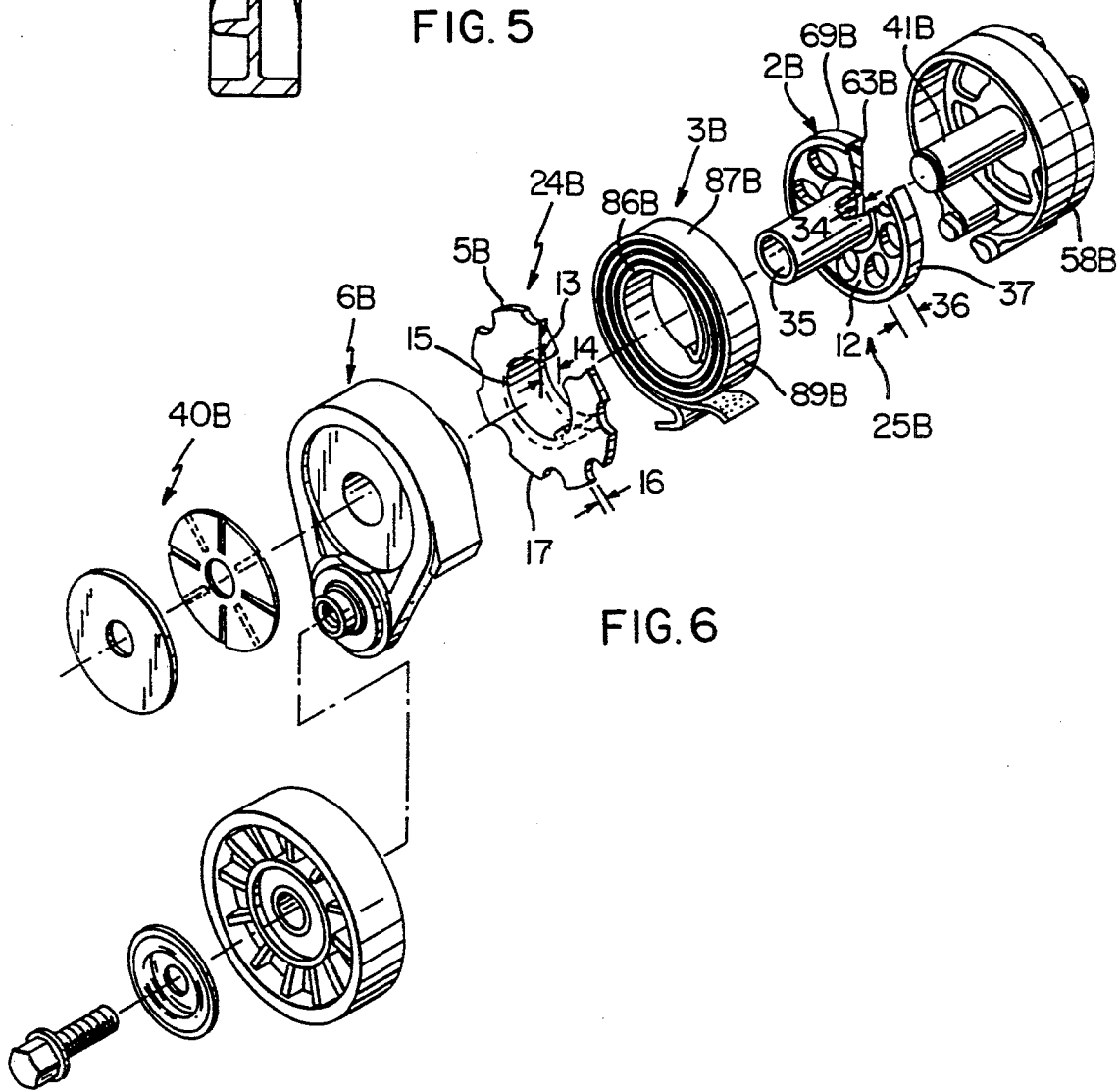
FIG. 6 is an exploded perspective view illustrating the various parts of the belt tensioner as shown in FIG. 5.

Yet another tensioner of this invention may be provided which is generally indicated by the reference numeral 22B in FIGS. 5 and 6 and parts thereof similar to the tensioner 22 previously described are indicated by like reference numerals followed by the reference letter "B".

Referring now to FIG. 5 and FIG. 6, first offsetting means 24B is created by producing a tapered spring bushing 5B having a cone shaped means 13 wherein the thickness 14 at the inner diameter 15 is different from the thickness 16 at the outer diameter 17 by a distance "d". Similarly, second offsetting means 25A is created by producing a tapered bushing member 2B having a concave shaped means 12 wherein the thickness 34 at the inner diameter 35 is different from the thickness 36 at the outer diameter 37 by a distance "d". When friction dampening means 40B, belt engaging means 6B, spring bushing member 5B, flat spirally wound metallic spring 87B and bushing member 2B are disposed upon shaft 41B of cup shaped member 57B, with a portion of the inside coil 86B in contact with first offsetting means 24B, and a portion of the outer coil 89B abutting second offsetting means 25B, then spring means 3B is displaced a distance "d" from its free state thereof providing the required normal force.

One skilled in the art will appreciate that concave shaped means 12 could be utilized in conjunction with cup shaped member 57 of FIG. 2 in place of bushing member 2A and cup shaped member 57A of FIG. 4 whereby second offsetting means 25B provided by the edge 63B on disc end member 69B replaces offsetting means 25A disposed in the end 26A of slot 90A of cup shaped member 57A. In this embodiment, edge 63B bears against a portion of the outer coil 89A of the spring 87A. It is apparent then that when friction dampening means 40A, belt engaging means 6A, spring bushing member 5A, flat spirally wound metallic spring 87A and concave shaped means 12 are disposed upon shaft 41A of cup shaped member 57, with a portion of the inside coil 86A in contact with first offsetting means 24A, and a portion of the outer coil 89A abutting second offsetting means 25B at edge 63B, then spring means 3A is displaced a distance "d" from its free state thereof providing the required normal force.

Similarly, bushing 5B with cone shaped means 13 could be utilized in conjunction with belt engaging means 6 of FIG. 2 in place of bushing member 5A and belt engaging means 6A of FIG. 4 whereby first offsetting means 24B provided by the thickness 14 at the inner diameter 15 replaces first offsetting means 24A disposed in end of slot 84A of belt engaging means 6A. In this embodiment, first offsetting means 24B bears against a portion of the inner coil 86A of the spring 87A. It is apparent then that when friction dampening means 40A, belt engaging means 6, bushing 5B with cone shaped means 13, flat spirally wound metallic spring 87A and bushing member 2A are disposed upon shaft 41A of cup shaped member 57A with a portion of the inside coil 86A in contact with first offsetting means 24B and a portion of the outer coil 89A abutting second offsetting means 25A, then spring means 3A is displaced a distance "d" from its free state thereof providing the required normal force.

From the foregoing description, it is apparent that other combinations of spring bushing 5, or 5B with cone shaped means 13, bushing member 2 or 2B, cup shaped means 57, 57A or 57B, belt engaging means 6 or 6A, and spring members 3, or 3A are possible to provide a normal force for a desired dampening force. It is also apparent that the thickness 14 of cone shaped means 13 or thickness 36 of concave shaped means 12 may also be different to provide for different distances "d" each associated with a different normal force. Furthermore, the length of slot 90 or slot 84 may be different to provide for different distances "d" whereby a different normal force is generated. Finally, the amount of offset "d" of spring member 3 can be changed to provide for a different normal force.

Tensioner 22 is assembled by placing the support means 1 upon a suitable fixture and held in a rotationally fixed position therewith by index pin 64 disposed on the closed end 58 of the cup shaped member 57 projecting into a suitable opening of the fixture whereby the open end 59 of cup shaped member 57 is free to receive the parts of the tensioner 22 as hereafter described. It can be seen from FIG. 2 that the various parts of the tensioner 22 of this invention can be readily assembled onto the shaft means 41 of the support means 1 by first telescopically disposing bushing member 2 upon shaft means 41 followed thereafter by telescopically disposing spring means 3 upon shaft means 41 and engaging the bent outer end 88 of the outer coil 89 of the spirally wound spring 87 in slot 90 of annular sidewall 91 of cup shaped member 57. Spring bushing 5 is then placed on tubular portion 71 of belt engaging means 6 with tab 93 disposed in the transverse axial slot 84. Slot 84 of belt engaging means 6 then engages the inwardly bent end 85 of the inner coil 86 of the spirally wound spring 87 and the other end 77 of the belt engaging means 6 is placed in a means (not shown) within the fixture which is adapted to rotationally move the other end 77 of the arm. Since spring means 3 is to be displaced axially by one of the methods described in these embodiments, and spring means 3 must be wound circumferentially in order to preset a minimum torsional load therein, it is apparent that belt engaging means 6 must be rotated clockwise and forced axially toward support means 1 and held from axially expanding by a means of holding (not shown) on the assembly fixture until assembly is completed. Once belt engaging means 6 is held in position upon support means 1, friction dampening means 40 is placed upon shaft means 41 and arm stop plate 8 is rigidly affixed to the reduced end portion 56 of the end 49 of shaft means 41 by any means known in the art such as by radial riveting.

A method of making a tensioner 22 for a power transmission belt that is adapted to be operated in an endless path comprises the steps of forming a support means 1 for being fixed relative to the belt, forming a belt engaging means 6 to be carried by the support means 1 and being movable relative thereto, forming frictional dampening means 40 to be operatively associated with the support means 1 and the belt engaging means 6 to dampen the movement of the belt engaging means 6 relative to the support means 1 in at least one direction of movement thereof, the dampening means 40 having a longitudinal axis 52. The method further comprises the steps of forming the support means 1 having a shaft means 41 disposed along longitudinal axis 52 and being fixed from movement relative to the belt engaging means 6, the belt engaging means 6 having a portion 71 thereof being rotatably carried by the shaft means 41 so as to rotate relative to the shaft means 41, forming the spring means 3 by winding a flat strip of spring steel circumferentially in the direction of the strip and displacing the mechanical spring means 3 axially from its free wound position along longitudinal axis 52. The method of making the tensioner 22 further comprises the steps of providing second offsetting means 25 within the support means 1 and first offsetting means 24 within the belt engaging means 6, whereby the spring means 3 is returned to a flat coil like shape upon assembly between the support means 1 and the belt engaging means 6. Finally, the method of making the tensioner 22 comprises the steps of forming the dampening means 40 having a friction dampening plate 7 with frictionally engaging surfaces 30 and 31 on opposite sides thereof, and having an arm stop 8 with frictionally engaging surface 33 on one side thereof, forming a frictionally engaging surface 32 on one side 75 of belt engaging means 6 and having the step of operatively associating mechanical spring means 3 with the support means 1 and with the belt engaging means 6 for urging the belt engaging means 6 relative to the support means 1 and against the belt with a force to tension the belt and urging the first surfaces 30 and 31 against the second surfaces 32 and 33 with a certain spring force providing a constant dampening force.

An optional method of making a tensioner 22 for a power transmission belt that is adapted to be operated in an endless path comprises the steps of forming a support means 1 for being fixed relative to the belt, forming a belt engaging means 6 to be carried by the support means 1 and being movable relative thereto, forming frictional dampening means 40 to be operatively associated with the support means 1 and the belt engaging means 6 to dampen the movement of the belt engaging means 6 relative to the support means 1 in at least one direction of movement thereof, the dampening means 40 having a longitudinal axis 52. The method further comprises the steps of forming the support means 1 to comprise a shaft means 41 having a longitudinal axis 52 and being fixed from movement relative to the belt engaging means 6, the belt engaging means 6 having a portion 71 thereof being rotatably carried by the shaft means 41 so as to rotate relative to the shaft means 41 and forming the spring means 3 by winding a flat strip circumferentially in the direction of the strip about longitudinal axis 52. The step of forming the support means 1 further comprises a step of forming a cone shaped means 13, disposing the cone shaped means 13 within the belt engaging means 6, forming a concave shaped means 12 opposing the cone shaped means 13, disposing the concave shaped means 12 upon the shaft means 41 adjacent the support means 1. The method of making a tensioner 22 of this invention further comprises the steps of disposing the spring means 3 between the cone shaped means 13 and the concave shaped means 12, abutting the mechanical spring means 3 against the cone shaped means 13 thereby offsetting axially the outer end 88 with second offsetting means 25 within the support means 1 with respect to the one end 85 with first offsetting means 24 within the belt engaging means 6. Finally, the method of making the tensioner 22 comprises the steps of forming the dampening means 40 having a friction dampening plate 7 with frictionally engaging surfaces 30 and 31 on opposite sides thereof, and having an arm stop 8 with frictionally engaging surface 33 on one side thereof, forming a frictionally engaging surface 32 on one side 75 of belt engaging means 6 and adding the step of operatively associating mechanical spring means 3 with the support means 1 and the belt engaging means 6 for urging the belt engaging means 6 relative to the support means 1 and against the belt with a force to tension the belt and urging the first surface 30 against the second surface 32 with a certain spring force providing a constant dampening force thereof.

Therefore, it can be seen that various modifications can be made in the various parts of this invention to provide an improved belt tensioner of this invention.

While the forms of this invention now preferred have been illustrated and described as required by the Patent Statute, it is to be understood that other forms can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a tensioner for a power transmission belt that is a adapted to be operated in an endless path, said tensioner comprising a support means for being fixed relative to said belt, a belt engaging means carried by said support means and being movable relative thereto, mechanical spring means operatively associated with said support means and said belt engaging means for urging said belt engaging means relative to said support means and against said belt with a force to tension said belt, and frictional damping means operatively associated with said support means and said belt engaging means to dampen the movement of said belt engaging means relative to said support means in at least one direction of movement thereof, said damping means having a longitudinal axis, said support means comprising a shaft means having a longitudinal axis and being fixed from movement relative to said belt engaging means, said belt engaging means having a portion thereof being rotatably carried by said shaft means so as to rotate relative to said shaft means, said damping means comprising at least one pair of frictionally engaging first and second surfaces, said mechanical spring means providing said force for urging said belt engaging means relative to said support means and against said belt to tension said belt and further providing a certain force for urging said first surface against said second surface to dampen the movement of said belt engaging means thereof, the improvement wherein one end of said spring means is axially displaced from a free wound position thereof by first offsetting means associated with said belt engaging means and a second end of said spring means is displaced axially from a free wound position thereof by concave shaped memos associated with said support means.

2. A tensioner as set forth in claim 1 wherein said mechanical spring means comprises a flat strip wound circumferentially in the direction of said strip.

3. A tensioner as set forth in claim 2 wherein said strip is steel.

4. A tensioner as set forth in claim 3 wherein said strip is spring steel.

5. A tensioner as set forth in claim 3 wherein said strip is wound circumferentially in the direction of the strip about a longitudinal axis and having at one end thereof displaced axially along said longitudinal axis.

6. A tensioner as set forth in claim 1 wherein said first offsetting means comprises a spring bushing member.

7. A tensioner as set forth in claim 1 wherein said first offsetting means comprises an abutting stop in a spring slot in said support means.

8. A tensioner as set forth in claim 1 wherein said concave shaped means associated with said support means comprises a tapered bushing member disposed between said mechanical spring means and said support means and having a thickness at an inner diameter different from a thickness at an outer diameter thereof.

9. A tensioner as set forth in claim 8 wherein said thickness at said inner diameter is less than said thickness at said outer diameter.

10. A tensioner as set forth in claim 8 wherein said thickness at said outer diameter is less than said thickness at said inner diameter.

11. In a tensioner for a power transmission belt that is adapted to be operated in an endless path, said tensioner comprising a support means for being fixed relative to said belt, a belt engaging means carried by said support means and being movable relative thereto, mechanical spring means operatively associated with said support means and said belt engaging means for urging said belt engaging means relative to said support means and against said belt with a force to tension said belt, and frictional damping means operatively associated with said support means and said belt engaging means to dampen the movement of said belt engaging means relative to said support means in at least one direction of movement thereof, said damping means having a longitudinal axis, said support means comprising a shaft means having a longitudinal axis and being fixed from movement relative to said belt engaging means, said belt engaging means having a portion thereof being rotatably carried by said shaft means so as to rotate relative to said shaft means, said damping means comprising at least one pair of frictionally engaging first and second surfaces, said mechanical spring means providing said force for urging said belt engaging means relative to said support means and against said belt to tension said belt and further providing a certain force for urging said first surface against said second surface to dampen the movement of said belt engaging means thereof, the improvement wherein one end of said spring means is axially displaced from a free wound position thereof by cone shaped means associated with said belt engaging means and a second end of said spring means is displaced axially from a free wound position thereof by second offsetting means associated with said support means.

12. A tensioner as set forth in claim 11 wherein said mechanical spring means comprises a flat strip wound circumferentially in the direction of said strip.

13. A tensioner as set forth in claim 12 wherein said strip is steel.

14. A tensioner as set forth in claim 13 wherein said strip is spring steel.

15. A tensioner as set forth in claim 13 wherein said strip is wound circumferentially in the direction of the strip about a longitudinal axis and having at one end thereof displaced axially along said longitudinal axis.

16. A tensioner as set forth in claim 11 wherein said second offsetting means comprises a spring bushing member.

17. A tensioner as set forth in claim 11 wherein said second offsetting means comprises an abutting stop in a spring slot in said support means.

18. A tensioner as set forth in claim 11 wherein said cone shaped means associated with said belt engaging means comprises a tapered bushing member disposed between said mechanical spring means and said belt engaging means and having a thickness at an inner diameter different from a thickness at an outer diameter thereof.

19. A tensioner as set forth in claim 18 wherein said thickness at said inner diameter is less than said thickness at said outer diameter.

20. A tensioner as set forth in claim 18 wherein said thickness at said outer diameter is less than said thickness at said inner diameter.

* * * * *